United States Patent
Eller et al.

(10) Patent No.: US 9,603,051 B2
(45) Date of Patent: Mar. 21, 2017

(54) SYSTEMS AND METHODS FOR PUSH-TO-TALK VOICE COMMUNICATION OVER VOICE OVER INTERNET PROTOCOL NETWORKS

(71) Applicant: CoCo Communications Corp., Seattle, WA (US)

(72) Inventors: A. Riley Eller, Seattle, WA (US); Dennis Edwards, Everett, WA (US); Norma Steveley, Seattle, WA (US); Don Moorehead, Seattle, WA (US)

(73) Assignee: CoCo Communications Corp., Seattle, WA (US)

( * ) Notice: Subject to any disclaimer, the term of this patent is extended or adjusted under 35 U.S.C. 154(b) by 64 days.

(21) Appl. No.: 14/339,237

(22) Filed: Jul. 23, 2014

(65) Prior Publication Data

US 2015/0029938 A1   Jan. 29, 2015

Related U.S. Application Data

(60) Provisional application No. 61/857,582, filed on Jul. 23, 2013.

(51) Int. Cl.
*H04W 4/00* (2009.01)
*H04W 28/04* (2009.01)
(Continued)

(52) U.S. Cl.
CPC ......... *H04W 28/04* (2013.01); *H04L 65/1083* (2013.01); *H04L 65/4061* (2013.01); *H04L 69/40* (2013.01); *H04W 4/10* (2013.01)

(58) Field of Classification Search
CPC .... H04W 28/04; H04W 4/10; H04L 65/1083; H04L 69/40
(Continued)

(56) References Cited

U.S. PATENT DOCUMENTS 6,658,027 B1   12/2003   Kramer et al.
6,862,298 B1   3/2005   Smith et al.
(Continued)

FOREIGN PATENT DOCUMENTS

WO   2007001964 A2   1/2007

*Primary Examiner* — Faisal Choudhury
(74) *Attorney, Agent, or Firm* — Lowe Graham Jones PLLC

(57) ABSTRACT

Push to talk (PTT) devices that communicate packet-based voice communications are disclosed. An example PTT device receives voice packets via a packet-based communication network from another PTT device. Voice information in the received voice packets are used to reconstruct the voice communication. The receiving PTT device is able to identify an occurrence of at least one delayed, corrupted or lost voice packet, and then communicate a packet re-transmit request to the other PTT device requesting a replacement voice packet that has a portion of the voice communication that is identical to the voice communication portion of the delayed, corrupted or lost voice packet. The voice communication may then be repaired based on the received replacement voice packet. While the voice communication is being repaired, a comfort tone may be generated so that the listener of the PTT device understands that the voice communication is being repaired.

19 Claims, 5 Drawing Sheets

(51) Int. Cl.
*H04L 29/06* (2006.01)
*H04L 29/14* (2006.01)
*H04W 4/10* (2009.01)

(58) Field of Classification Search
USPC .......................................................... 370/328
See application file for complete search history.

(56) References Cited

U.S. PATENT DOCUMENTS

| | | | |
|---|---|---|---|
| 7,617,337 B1 | 11/2009 | Beck et al. | |
| 8,054,754 B1 * | 11/2011 | Xue | H04M 7/0084 370/248 |
| 2002/0037735 A1 * | 3/2002 | Maggenti | H04L 63/0428 455/517 |
| 2006/0182030 A1 * | 8/2006 | Harris | H04L 1/1809 370/230 |
| 2006/0291452 A1 * | 12/2006 | Velagaleti | H04L 1/1671 370/352 |
| 2009/0280850 A1 * | 11/2009 | Mathur | G06F 9/54 455/518 |
| 2011/0019662 A1 * | 1/2011 | Katis | H04L 12/1831 370/352 |

\* cited by examiner

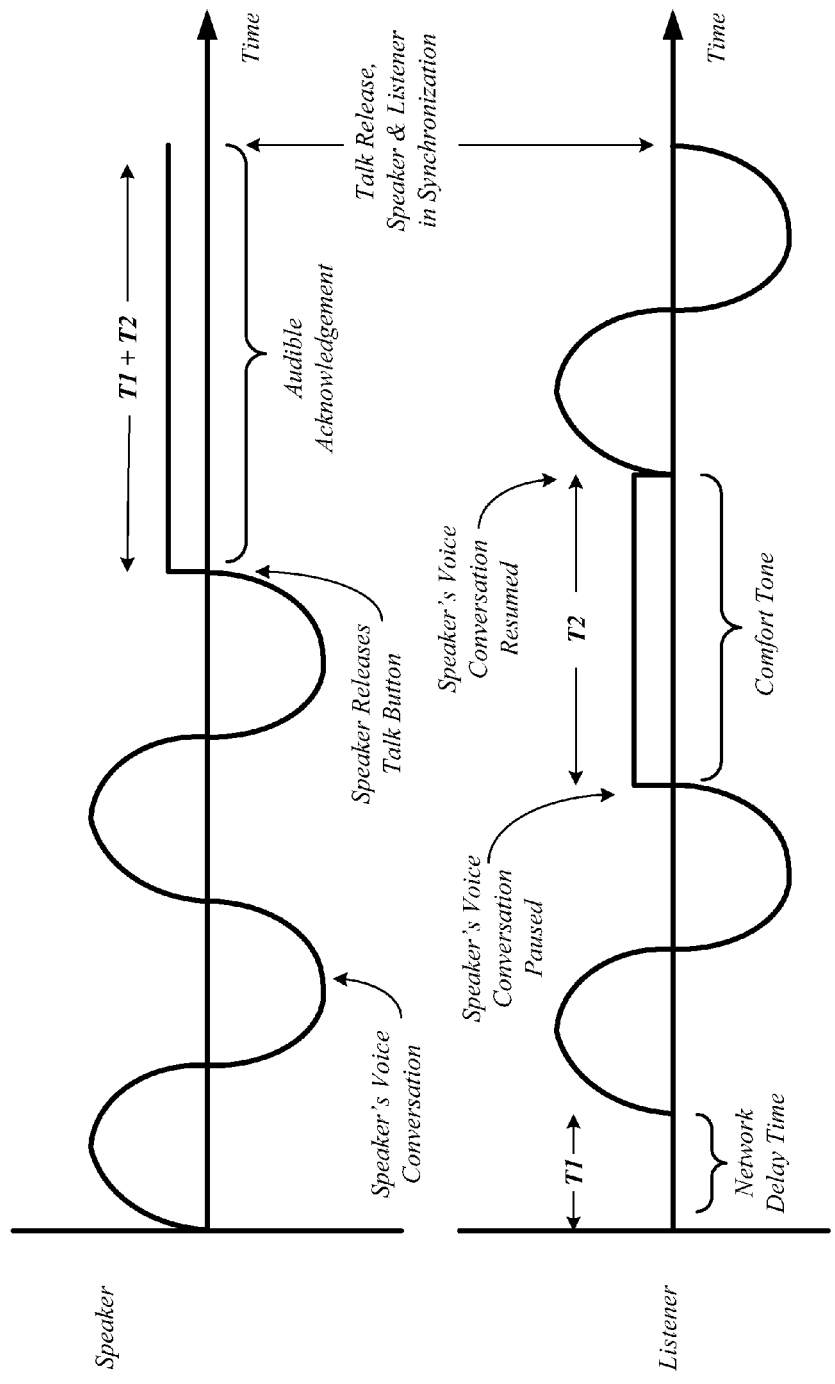

SYSTEMS AND METHODS FOR PUSH-TO-TALK VOICE COMMUNICATION OVER VOICE OVER INTERNET PROTOCOL NETWORKS

PRIORITY CLAIM

This application claims the benefit of and priority to U.S. provisional patent application Ser. No. 61/857,582, filed Jul. 23, 2013, entitled "SYSTEMS AND METHODS FOR PUSH-TO-TALK VOICE COMMUNICATION OVER VOICE OVER INTERNET PROTOCOL NETWORKS," and which is incorporated herein by reference in its entirety.

BACKGROUND OF THE INVENTION

Voice communication quality is generally measured in terms of its reproduction fidelity. If there are gaps or other noise in received communicated voice messages due to a failure to receive portions of voice communications from the talker, the listener will often become distracted and/or agitated, particularly if the listener must repeatedly request the talker to repeat parts of the conversation. Further, the listener may misunderstand the intent of the talker if certain key words are not clearly reproduced at the listener's device. For example, if the talker is requesting that the listener "not" do a described act, such as "do not shoot", and if the phrase "do not" is not clearly reproduced at the listener's device, and is therefore not heard by the listener, then the listener will misunderstand the intent of the talker.

Push-to-talk (PTT), also known as Press-to-Transmit, is a communication method of having voice conversations using PTT devices that employ on half-duplex communication lines. PTT devices, such as two-way radios, employ a momentary talk button that is activated by the user to switch from voice communications reception mode (where the PTT device user is listening to the voice communications, and wherein the talk button is released) to voice communications transmit mode (where the PTT device user is speaking during the voice communications, and wherein the talk button is depressed or is otherwise activated).

PTT communication systems are often used by government agencies, and in particular emergency service agencies, to provide efficient and secure communications between agency personnel. These PTT communication systems are particularly desirable in situations and/or locations where existing duplex-based cellular communication networks are not available and/or not secure. Exemplary government agencies that provide emergency services include police departments, fire departments, emergency medical services (EMS), or the like, wherein personnel are at a particular activity site performing a service which requires communications to other personnel and/or to an operation station or the like. In some situations, multiple government agencies are providing a coordinated response to an emergency such that the agency personnel from different government agencies are in communication with each other.

There are potential sources of voice communications impairment in a PTT communication system that are small and constant in their effect, such as a loose wire or a defect in the microphone's manufacture. These types of defects may occur in other types of voice communications system.

There also exist highly-variable effects, such as wireless interference or network congestion. Real-time voice communication systems, like full duplex telephone networks, have no recourse for lost portions of voice communications when wireless interference or network congestion occur. In contrast, packet-based communication networks permit retransmission of packets containing voice data that has been delayed, corrupted and/or lost. However, packet retransmission comes at the expense of increased network traffic congestion and/or late delivery of the final voice communications to the listener, which are themselves forms of voice communications impairment. The engineering problem space of using packet-based communication networks for PTT voice communications may be summarized as "correcting voice packet loss of voice communications creates variable delivery timing of the voice communications between the speaker and the listener using PTT type communication devices." Providing perfect, timely, and error free voice communications for users of PTT communication systems, and particularly for emergency service providers, is essential.

When PTT communication devices suffer from unpredictable time delays, such as time delays that may occur if an intervening packet-based communication network is used to transmit PTT communications from a speaker to a listener, the users (who alternate between being a speaker and a listener) may have a hard time keeping their conversation in step. That is, time delays in the delivery of voice communications data packets over the packet-based communication network may be perceived as "gaps" in the conversation between the users, or may be perceived as periods of silence. A gap of 20 milliseconds or more is perceivable by the listener.

For example, a speaker might ask a simple question, and then listen for the "yes" or "no" reply from the recipient listener. But, if the recipient listener doesn't hear the question for several milliseconds, or even a few seconds, due to packet delays in delivery of one or more voice communications packets over the packet-based communication network, the speaker asking the question might either repeat themselves, or misinterpret the recipient listener's silence as hesitation. The ensuing confusion may last for a few seconds or go on indefinitely in the event of severe packet delays and/or lost packets.

Legacy PTT communication systems are not well configured to operate when an intervening packet-based communication network is used to facilitate communications between the speaker and the listener because of potential deficiencies, such as network congestion, packet loss, and/or frame payload corruption, that may be encountered during the operation of a packet-based communication network. Therefore, emergency service providers who rely of accurate and timely voice communications while using their PTT devices do not rely upon communication systems that employ packet networks, like the Internet, if at all possible.

Accordingly, there is a need in the arts to provide systems and methods that provide users of PTT devices reliable, accurate, and timely voice communications when an intervening packet-based communication network is employed to communicate voice communication packets between the PTT devices.

BRIEF DESCRIPTION OF THE DRAWINGS

Preferred and alternative embodiments are described in detail below with reference to the following drawings:

FIGS. 6A and 6B are conceptual illustrations of timelines of a voice conversation provided by embodiments of the PTT communication system.

DETAILED DESCRIPTION OF THE PREFERRED EMBODIMENT

Figure 1:
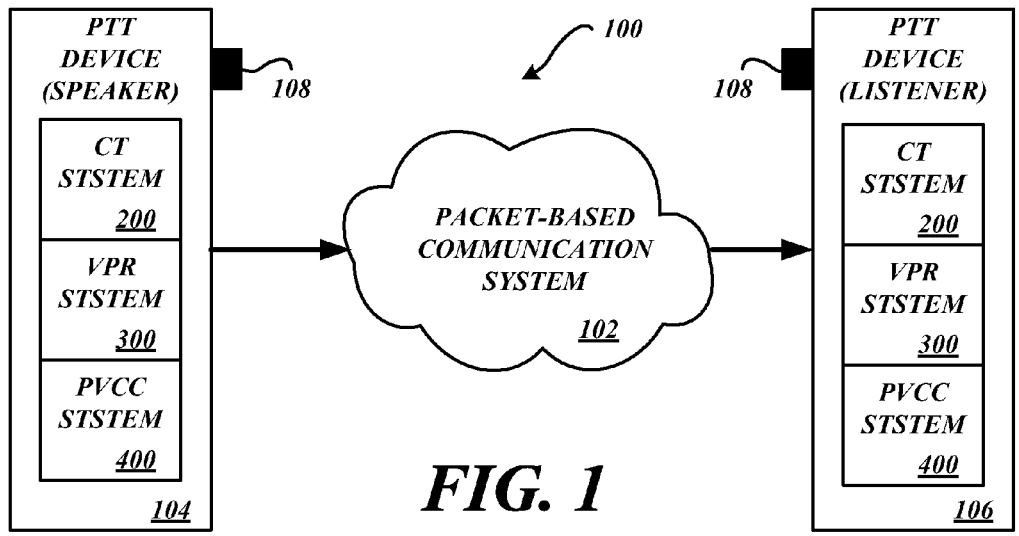
FIG. 1 is a block diagram of an embodiment of packet-based communication network compatible push-to-talk (PTT) system.

FIG. 1 is a block diagram of an embodiment of packet-based communication network compatible push-to-talk (PTT) communication system 100 (interchangeably referred to as a Press-to-Transmit system 100) that includes an embodiment of a comfort tone (CT) system 200, an embodiment of a voice packet recovery (VPR) system 300, and an embodiment of a perfect voice communication confirmation (PVCC) system 400. Various embodiments of the comfort tone system 200, the voice communications packet recovery system 300, and/or the perfect voice communication delivery confirmation system 400, cooperatively act together to provide a perfect voice communication that is heard by the listener, and is understood by the speaker to have been successfully communicated. A perfect voice communication is defined as a reliable, accurate, and timely voice communication when an intervening packet-based communication system 102 is employed to communicate voice communication packets between PTT devices 104 and 106 for a single talk event.

In operation, when the speaker is speaking into their PTT device 104 during a single talk event, the speaker depresses a talk button 108 to gain talk access to the PTT communication system 100. The voice communication corresponding to the speech of the speaker is digitized, parsed into data packets, sent to the listener's PTT device 106 over the intervening packet-based communication system 102, and is then reconstructed into an audible reproduction of the speech at the listener's PTT device 106. When the speaker is done speaking, the speaker releases the talk button 108 to effect a talk release action by the PTT communication system 100 that concludes the talk event.

The PTT communication system 100 communicates a plurality of serially ordered voice communication packets (interchangeably referred to herein as voice packets) from the speaker's PTT device 104 to the listener's PTT device 106. In some instances, delivery of one or more of the voice packets are delayed beyond a threshold duration, are corrupted, and/or are lost (referred to herein as jitter). In such situations, an embodiment of the comfort tone system 200 operates the listener's PTT device 106 so that an audible comfort tone is emitted from listener's PTT device 106, and is heard by the listener, while delayed, corrupted or lost voice packets are obtained at the listener's PTT device 106. Accordingly, the listener understands, upon hearing the audible comfort tone, that some amount of additional time is required for delivery of a perfect voice communication from the speaker's PTT device 104.

When delivery of one or more of the plurality of serially ordered voice packets is delayed, corrupted or lost, an embodiment of the voice communications packet recovery system 300 transmits a packet re-transmit request from the listener's PTT device 106 to the speaker's PTT device 104. The packet re-transmit request is a request to resend identified delayed, corrupted or lost voice packets from the speaker's PTT device 104 to the listener's PTT device 106. When a replacement voice packet is received at the speaker's PTT device 104 that replaces a corresponding delayed, corrupted or lost voice packet, the voice message is repaired using the replacement voice packet such that a perfect voice communication (an error-free voice communication) is heard by the listener.

When the perfect voice communication has been delivered to the listener via the listener's PTT device 106, an embodiment of the perfect voice communication delivery confirmation system 400 communicates confirmation information to the speaker's PTT device 104. In these embodiments, when the speaker releases a talk button 108 or the like on their PTT device 104 to indicate that they are done speaking, an audible confirmation (such as an audible tone, audible message, voice message or the like) is provided to the speaker to indicate that the perfect voice communication has been successfully delivered to the listener. An example embodiment of the perfect voice communication delivery confirmation system 400 modifies the conventional two-tone audible sound that is heard by the speaker to indicate that the talk release has been completed. Some embodiments of the speaker's PTT device 104 receive the confirmation information from the listener's PTT device 106 after successful delivery and/or communication of the perfect voice communication to the listener. In other embodiments, the listener's PTT device 106 communicates estimates of delay time (corresponding to the time that the comfort tone is emitted to the listener) to the speaker's PTT device 104. The speaker's PTT device 104 may then determine a duration of the audible confirmation that is heard by the speaker after they release the talk button 108.

In the example embodiment illustrated in FIG. 1, the speaker's PTT device 104 and the listener's PTT device 106 are conceptually illustrated as being communicatively coupled to the intervening packet-based communication system 102. Any suitable packet-based communication network may be used to communicate the voice packets between the PTT devices 104, 106. The intervening packet-based communication system 102 may be any type of suitable communication system. Non-limiting examples of packet-based communication system 102 include: the Internet, standard telephony systems, frame relay based systems, internet or intranet systems, local access network (LAN) systems, Ethernet systems, cable systems, radio frequency (RF) systems, cellular systems, or the like. Furthermore, the packet-based communication system 102 may be a hybrid system comprised of one or more of the above-described systems.

Various embodiments of the comfort tone system 200, the voice communications packet recovery system 300, and/or the perfect voice communication delivery confirmation system 400, are described in greater detail hereinbelow. Further, it is appreciated by one skilled in the art that the embodiments of the comfort tone system 200, the voice communications packet recovery system 300, and/or the perfect voice communication delivery confirmation system 400, are conceptually described in the context of the speaker's PTT device 104 sending voice communications to the listener's PTT device 106. One skilled in the art appreciates that the PTT device 106 may send voice communications to the PTT device 104 in a similar fashion. Further, one skilled in the art understands that a plurality of PTT devices may be communicating with each other at various times using the packet-based communication network compatible PTT system 100. Accordingly, it is appreciated by one skilled in the art that all participating PTT devices are provisioned with one or more embodiments of the comfort tone system 200, the voice communications packet recovery system 300, and/or the perfect voice communication delivery confirmation system 400.

Figure 2:
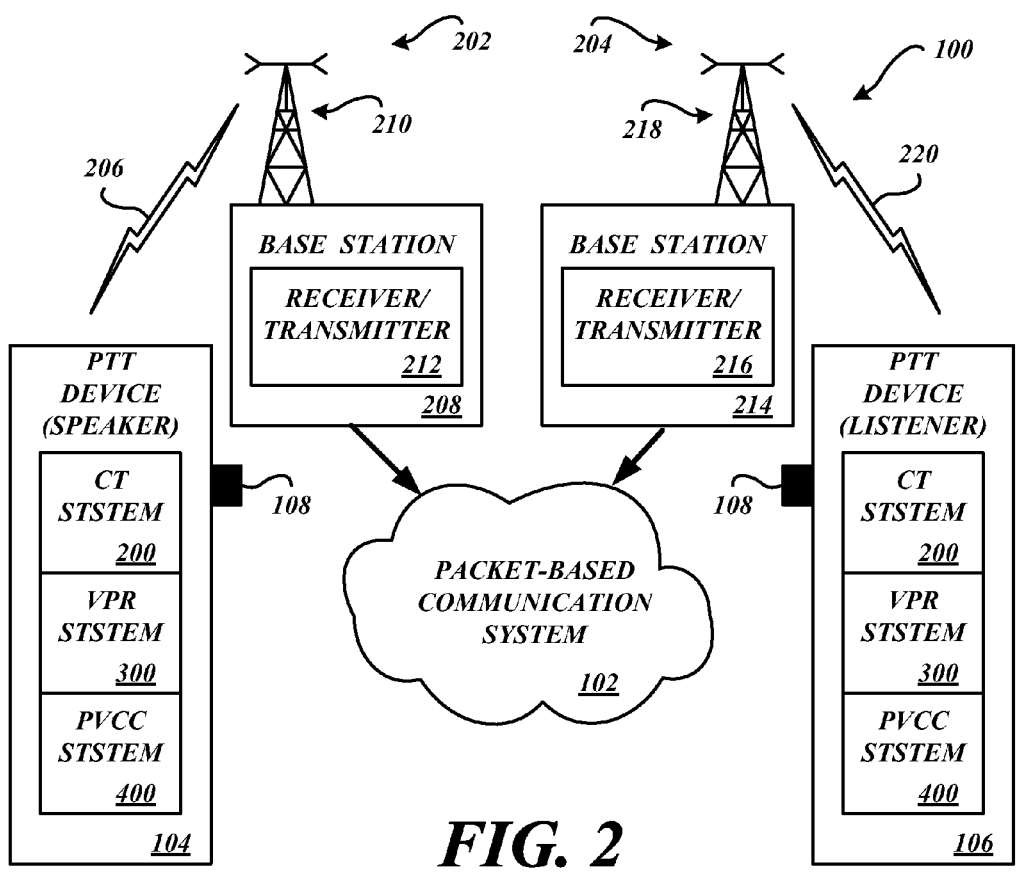
FIG. 2 is a block diagram of an alternative embodiment of packet-based communication network compatible PTT system that couples the PTT devices to the intervening packet-based communication system using radio frequency (RF) systems.

FIG. 2 is a block diagram of an alternative embodiment of packet-based communication network compatible PTT system 100 that couples the PTT devices 104, 106 to the intervening packet-based communication system 102 using radio frequency (RF) systems 202, 204. In this example, the speaker's PTT device 104 is communicating the packetized voice communications, via RF signal 206, to the base station 208. The RF signal emitted by the speaker's PTT device 104 is detected at the antenna 210, and is processed by the receiver/transmitter 212. The receiver/transmitter 212 is a system that is configured to process the received packetized voice communication into a digital signal that is sent to the listener's PTT device 106 via the intervening packet-based communication system 102.

The second base station 214 receives the packetized voice packets from the packet-based communication system 102. The second receiver/transmitter 216 generates a suitable signal that is emitted from the antenna 218 as an RF signal 220. The listener's PTT device 106 receives the RF signal 220 having packetized voice communications therein, and then constructs the voice conversation therefrom. One skilled in the art appreciates that the receiver/transmitters 212, 216 facilitate two-way voice communications.

It is appreciated by one skilled in the art that the packet-based communication network compatible PTT systems 100 of FIGS. 1 and 2 merely present alternative embodiments of the various types of PTT devices and/or communication systems that may be used by the various embodiments. For example, but not limited to, one of the speaker's PTT device 104 or the listener's PTT device 106 may be configured to communicate wirelessly using RF signals 206, 220. Additionally, or alternatively, a plurality of many different types of PTT devices may be communicatively coupled together using the various intervening communication networks illustrated in FIGS. 1 and/or 2.

Figure 3:
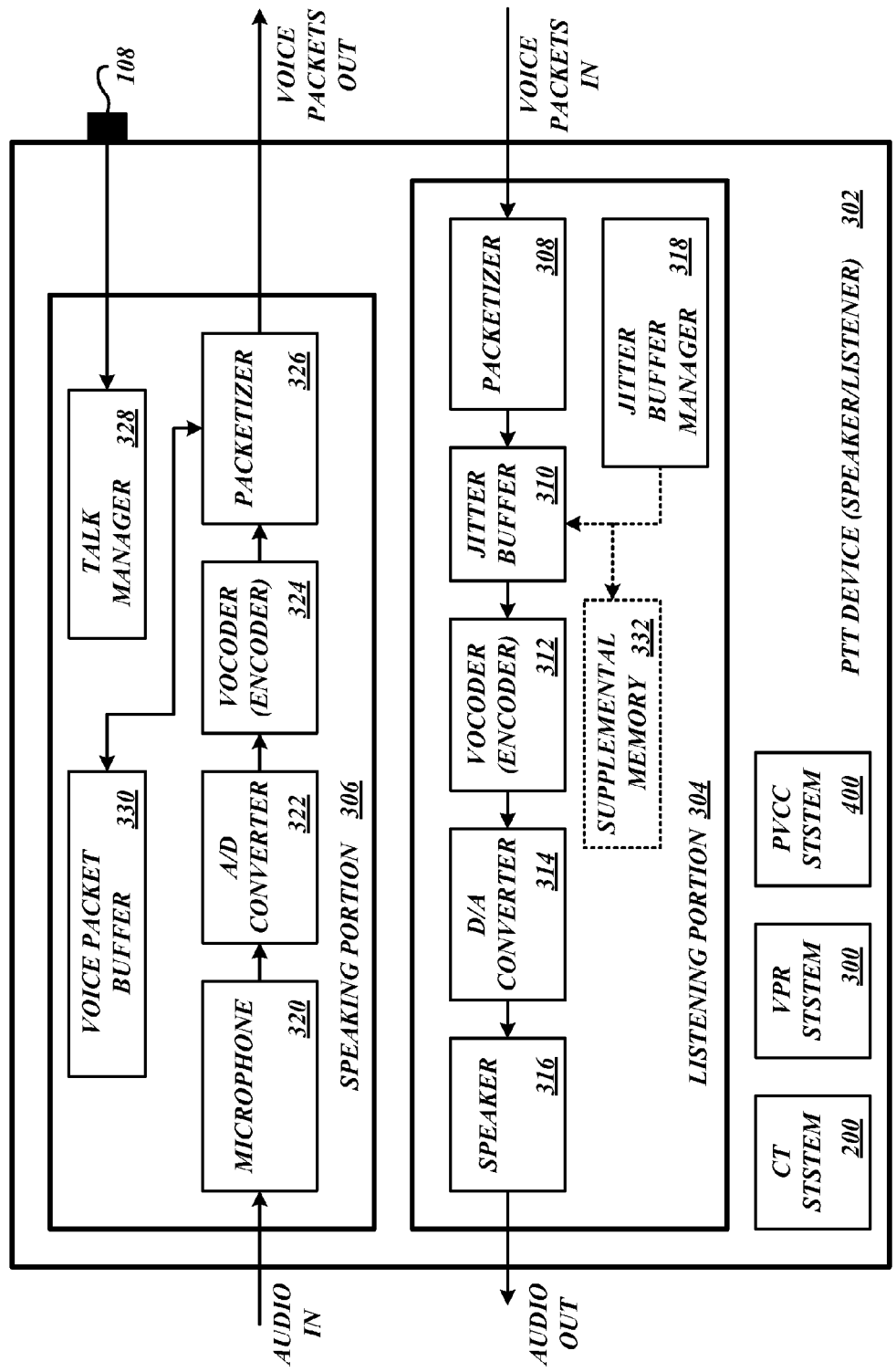
FIG. 3 is a block diagram of an embodiment of a PTT device provisioned with embodiments of the comfort tone system, the voice communications packet recovery system, and/or the perfect voice communication delivery confirmation system.

FIG. 3 is a block diagram of an embodiment of a PTT device 302 provisioned with embodiments of the comfort tone system 200, the voice communications packet recovery system 300, and/or the perfect voice communication delivery confirmation system 400. To conceptually disclose embodiments of the PTT device 302, a listening portion 304 and a speaking portion 306 of the PTT device 302 are disclosed.

The listening portion 304 of the PTT device 302 comprises a packetizer 308, a jitter buffer 310, a vocoder (encoder) 312, a digital to analog (D/A) converter 314, and a speaker 316. Further, a jitter buffer manager 318 is included in the listening portion 304 of the PTT device 302 to facilitate operation of the jitter buffer 310 and/or other components of the listening portion 304 of the PTT device 302.

The speaking portion 306 of the PTT device 302 comprises a microphone 320, an analog to digital (A/D) converter 322, a vocoder (encoder) 324, a packetizer 326 and a voice packet buffer 330. Further, a talk manager 328 is included in the speaking portion 306 of the PTT device 302 to facilitate management of the operation of the speaking portion 306 of the PTT device 302. A talk event is initiated in response to the speaker actuating the talk button 108. The talk manager 328 detects actuation of the talk button 108, and then permits the speaking portion 306 to begin processing a voice communication spoken by the user.

It is appreciated that any of the above described components may be implemented as hardware, software, and/or firmware (a combination of hardware and software). In alternative embodiments, the above-described components may be connectively coupled in a any suitable manner. Further, one or more of the above-described components may be directly coupled to each other or may be coupled to each other via intermediary components (not shown). Additionally, one or more of the above described components may be implemented as a single component, and/or may be implemented with other components (not shown or described herein). For example, but not limited to, the voice packetizers 308, 326, may be implemented as a single component in some embodiments. As another non-limiting example, the vocoders 312, 324 may be implemented as a single component in some embodiments. Detailed operation of the above-described individual components residing on the PTT device 302 are not described in detail herein other than to the extent necessary to understand the operation and functionality of these components when employed as part of the PTT communication system 100.

Other components, not shown, may be included in various embodiments of the PTT device 302. That is, FIG. 3 is generally limited to illustrating those components relevant to the operation and functioning of embodiments of the PTT device 302 when operating in the PTT communication system 100. Omitted components that are not illustrated in FIG. 3, or that are not discussed in detail, may not be necessarily relevant to disclosure and enablement of the specific novel features of the various embodiments of the comfort tone system 200, the voice communications packet recovery system 300, and/or the perfect voice communication delivery confirmation system 400 embodied in the PTT device 302. One skilled in the art appreciates the operation and structure of such omitted components which are not described or illustrated herein.

Operation of the listening portion 304 of the PTT device 302 is now described in greater detail. The packetizer 308 receives voice packets from the packet-based communication system 102. The incoming voice packets correspond to a voice communication spoken by a speaker using another PTT device 302 (such as the example speaker's PTT device 104 of FIGS. 1 and 2). Packets may be formatted using any suitable protocol. For example, voice packets may be constructed under the real-time transport protocol (RTP). Packet length (sizes) may be variable. Some embodiments may be configured to receive voice packets from multiple PTT devices 302 that employ different packetization protocols.

Since a voice communication is parsed into a sequential series of portions that are digitized, and then encapsulated in a voice packet, each of the serial ordered sequence of voice packets includes a suitable identifier that identifies the relative position of that particular voice communication packet in the serial ordered sequence of voice packets. In an example embodiment, the identifier is control information that is referred to as a frame sequence number or identifier that identifies the relative location of particular voice communications packets in the voice communication. Any suitable identifier may be used in the various embodiments.

Accordingly, the digitized payload (the encapsulated digitized portion of the voice communication) and the identifier are then passed (communicated to) from the packetizer 308 to the jitter buffer 310. In some embodiments, the voice packets are passed from the packetizer 308 to the jitter buffer 310.

The jitter buffer 310 is a memory device that includes a memory (not shown) configured to store the voice packets received from the packetizer 308. The jitter buffer 310 is configured to store the received voice packets (or the corresponding packet payloads of the received voice packets) in the ordered series defined by the identifier that is included with each voice packet. A voice packet payload is the encapsulated digitized portion of the voice communication contained in an individual voice packet. In an example embodiment, the memory of the jitter buffer 310 is configured to store approximately 300 milliseconds of voice communications. However, other embodiments may have a larger memory, or is part of a relatively larger memory, which may be used by other devices or systems, such that the memory used by the jitter buffer 310 has a capacity that can be dynamically adjusted.

In some embodiments, the management of the jitter buffer 310 is controlled by the jitter buffer manager 318. Thus, the jitter buffer manager 318 is a software or firmware component that analyzes the integrity of the received individual voice packets (or the corresponding digitized portions of the voice communication) and the sequence identifier so that the individual voice packets (or the corresponding digitized portions of the voice communication) are stored in the jitter buffer 310 in their correct order.

Figure 4:
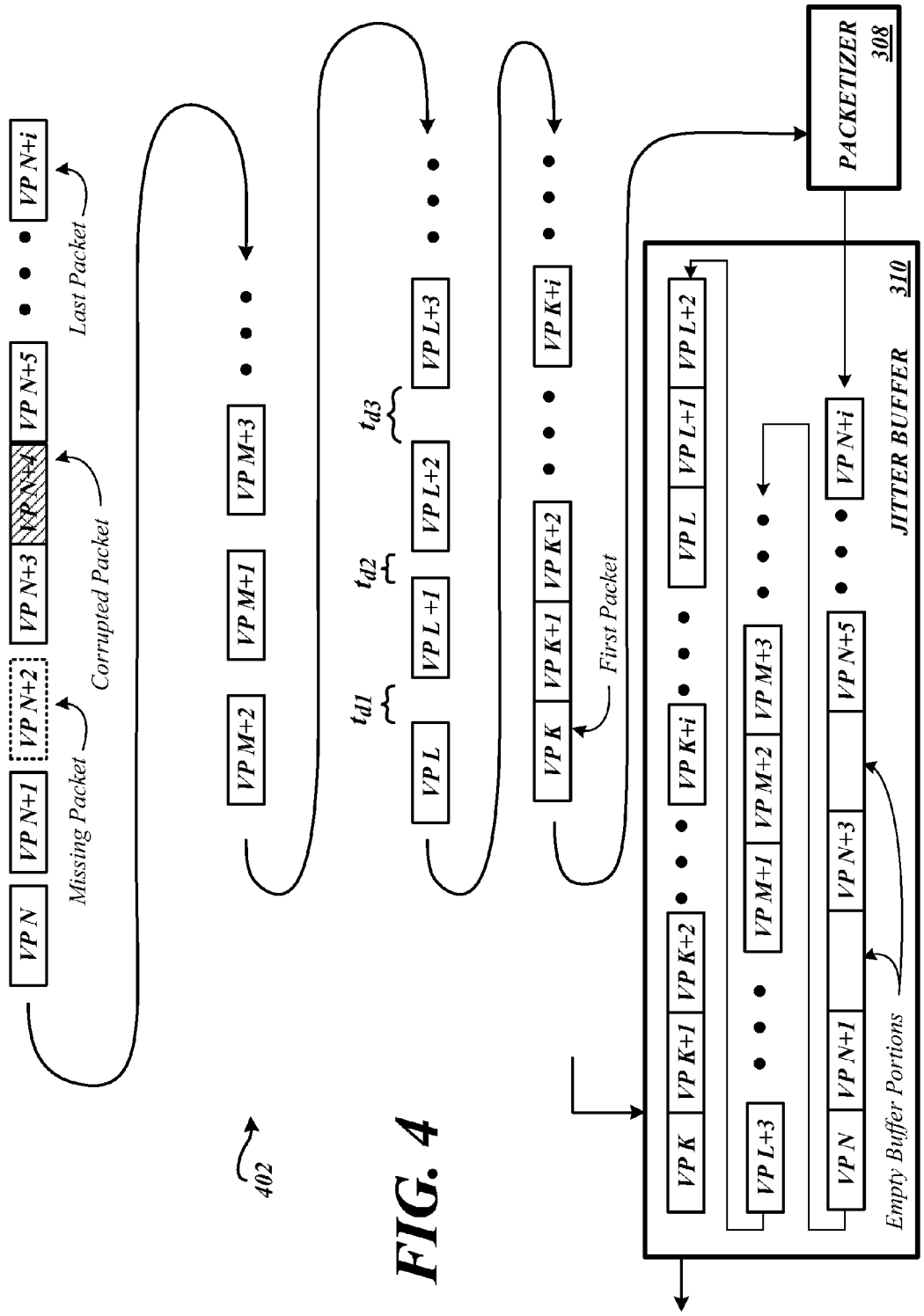
FIG. 4 is a conceptual diagram illustrating a stream of voice packets being delivered from the packet-based communication network to the packetizer into the jitter buffer.

FIG. 4 is a conceptual diagram illustrating a stream of voice packets 402 being delivered from the packet-based communication system 102 (not shown) to the packetizer 308 (see also FIG. 3). The received voice packets 402 are processed and delivered into (stored into) the memory of the jitter buffer 310. The individual voice packets (or the corresponding digitized portions of the voice communication) are then streamed as an output to the vocoder 312 (not shown).

The voice packet (VP K) is, in this hypothetical example, the first voice packet in the voice communications. Upon receipt of this first voice packet (VP K), the first voice packet (VP K) is stored into the first position in the memory of the jitter buffer 310. As subsequent voice packets are received, the voice packets are stored into the memory of the jitter buffer in serial order in accordance with their identifying information. At some point, measure by a predetermined number of stored voice packets (and/or a duration associated with the corresponding digitized portions of the voice communication), the first voice packet (VP K) is streamed out of listening portion 304 to the vocoder 312 (FIG. 3) so that the PTT device 302 begins the process of generating an audible reproduction of the voice communication.

The packetizer 308 processes the received first voice packet (VP K), and then other subsequently received voice packets 402 in the order that they are received. The processed voice packets are then stored in memory of the jitter buffer 310, as conceptually illustrated in FIG. 4.

Embodiments may employ one of two kinds of jitter buffers 310, static jitter buffers and dynamic jitter buffers. A static jitter buffer 310 is preferably hardware-based and may be configured by the manufacturer. A dynamic jitter buffer 310 is software-based and can be configured by the PTT device 302 to adapt to changes in numbers of voice packets delivered through the packet-based communication system 102. In some embodiments, the size of the memory of the jitter buffer 310 is variable to further facilitate adaptation to varying delays and/or variable length voice packets.

FIG. 4 conceptually illustrates that after the first packet (VP K), a plurality of next voice packets (VP K+1) through (VP K+i) are received with little or no delay (as conceptually indicated by the adjacency of the illustrated voice packets to each other). After some predefined duration for the jitter buffer 310 to fill to some predefined amount of voice packets (and/or a duration associated with the corresponding digitized portions of the voice communication), the jitter buffer 310 may then begin transferring the stored voice packets in a serial fashion out to the vocoder 312.

The vocoder 312 deconstructs individual voice packets (or the corresponding digitized portions of the voice communication) received from the jitter buffer 310 into digital data that corresponds to the digitized portion of the voice communication. The digitized portion of the voice communication is then passed from the vocoder 312 to the D/A converter 314, which converts the received digitized portion of the voice communication into an analog portion of the voice communication. The analog portion of the voice communication is then passed from the D/A converter 314 to the speaker 316, which is actuated to generate sound (corresponding to the analog portion of the voice communication) that is heard by the listener. That is, the speaker 316 generates an audible reproduction of the voice communication.

The jitter buffer 310 is configured to pass the voice packets (or the corresponding digitized portions of the voice communication) in the correct serial order to the vocoder 312 in a timed fashion (wherein each streamed voice packet is separated by a relatively small duration). In practice, after the jitter buffer 310 has initially filled with a predetermined minimum number or amount of first received good individual voice packets (or the corresponding digitized portions of a current portion of the voice communication), operation of the jitter buffer 310 is initiated. This predetermined minimum number or amount of first received good individual voice packets (or the corresponding digitized portions of the current portion of voice communication) is referred to herein as a low water mark. Since it takes some amount of time for the jitter buffer 310 to fill to at least its low water mark level, an inherent delay is built into the operation of the jitter buffer 310 so that individual voice packets (or the corresponding digitized portion of the voice communication) are communicated to the vocoder 312 after the delay. Once the jitter buffer 310 begins to drain the initially received voice packets (or the corresponding digitized portions of the voice communication), the listener will begin to hear the initial part (current portion) of the voice communication.

It is appreciated that some of the voice packets may be received after some delay duration. Voice packet delivery delay may be due to transmission delays experienced through the packet-based communication system 102. For example, FIG. 4 conceptually illustrates that different delays are occurring in delivery of the voice packets (VP L+1) through (VP L+3).

In FIG. 4, a time delay between delivery of the voice packet (VP L+1) and the voice packet (VP L) is conceptually illustrated, denoted as the duration of $T_{d1}$. Similarly, there is a time delay of $T_{d2}$ between delivery of the voice packet (VP L+2) and the voice packet (VP L+1), and a time delay of $T_{d3}$ between delivery of the voice packet (VP L+3) and the voice packet (VP L+2). The time delays $T_{d1}$, $T_{d2}$, and $T_{d3}$ may be caused by a variety of factors, such as traffic congestion in the packet-based communication system 102, and accordingly, the time delays $T_{d1}$, $T_{d2}$, and $T_{d3}$ may be different from each other. However, eventually, these voice packets (VP L+1) through (VP L+i) are received at the packetizer 308 and are then stored in their proper sequential order in the memory of the jitter buffer 310.

The low water mark corresponding to a delay duration (time period) before operation of the jitter buffer 310 is initiated accommodates for any anticipated amount, or known amount, of voice packet delays that occur as the voice packets are communicated through the packet-based communication system 102. Accordingly, individual voice packets (or the corresponding digitized portions of the voice communication) are sent to the vocoder 312 in evenly spaced intervals. This variation in packet arrival time, called jitter or delay, can occur because of network congestion, timing drift, or route changes that may occur in the packet-based communication system 102. The jitter buffer 310 intentionally delays the communication of the initially arriving individual voice packets (or the corresponding digitized portions of the voice communication) to the vocoder 312 so that any delayed later received voice packets may be timely appended to previously received voice packets when they are streamed out from the jitter buffer 310. Accordingly, the listener experiences a clear and jitter free connection with very little sound distortion since the time delays have been effectively removed by operation of the jitter buffer 310.

It is appreciated that some of the voice packets may be received out of order due to transmission delays that impact particular ones of the communicated voice packets. For example, FIG. 4 conceptually illustrates that the later generated voice packet (VP M+2) is delivered to the packetizer 308 before delivery of the previously generated voice packet (VP M+1). Here, a delay to the delivery of the voice packet (VP M+1) is such that the voice packet (VP M+2) arrived first at the packetizer 308. The voice packet (VP M+3) was then received after the voice packet (VP M+1). Here, the later received voice packet (VP M+1) is inserted into position in the memory of the jitter buffer 310 before the earlier received and stored voice packet (VP M+2).

Thus, if out of order voice packets are received at the packetizer 308, the packetizer 308 simply passes the received voice packets to the jitter buffer 310 in the order received from the packet-based communication system 102, and the jitter buffer 310 sorts and stores each voice packet in the proper sequential order (in accordance with the identifiers in each of the received voice packets), as illustrated by the stored voice packets (VP M+1) through (VP M+3) of FIG. 4.

It is appreciated that some of the voice packets may be lost, such as the voice packet (VP N+2) conceptually illustrated in FIG. 4. Further, some voice packets may be corrupted, such as the voice packet (VP N+4) conceptually illustrated in FIG. 4 using the diagonal line hatching of the voice packet block. Here, the contents (payload) of the voice packet (VP N+4) has been damaged through a bit loss or the like. That is, the contents of the voice packet (VP N+4) cannot be used to accurately reconstruct that portion of the voice communication. Thus, if voice packets are lost or corrupted, the jitter buffer 310 leaves a gap or the like, referred to herein as a null buffer portion, in its memory for these lost or corrupted voice packets, as illustrated in FIG. 4.

During operation, if the delays induced by the packet-based communication system 102 are within the designed delay of the jitter buffer 310, then the received voice packets are processed and passed from the jitter buffer 310 to the vocoder 312 to the D/A converter 314 to the speaker 316 in sequential fashion with little or no gaps between the individual portions of the voice communication. Accordingly, the listener will hear a perfect reproduction of the entire voice communication (with no, or virtually no, perceptible distortion, gaps or interfering noise).

Embodiments of the jitter buffer manager 318 are configured to identify corrupted voice packets. Further, the jitter buffer manager 318 may identify any lost (missing) voice packets and/or any late voice packets that have not yet been received (within a predefined duration). For example, one or more of the voice packets may be delayed by a very long duration during transmission over the packet-based communication system 102, and thus, would not be received by the PTT device 302 in a timely manner. Such corrupt, lost or delayed voice packets would therefore not be included in their ordered position in the jitter buffer 310.

As the jitter buffer 310 is draining (passing along individual voice packets or the corresponding digitized portions of the voice communication) into the vocoder 312, at some juncture the missing voice packet, denoted by the empty buffer portion conceptually illustrated in FIG. 4, (and corresponding to a corrupted, lost or delayed voice packet) will reach a position in the jitter buffer 310, where it is ready to be passed out to the vocoder 312.

Legacy PTT devices simply pass the null buffer portion out to the vocoder 312, which results in undesirable distortion of the reproduced voice communication. This distortion is very distracting to the listener. If there is a relative large sequential plurality of null buffer portions in the jitter buffer 310, an entire portion of the voice communication may be lost or otherwise not delivered to the listener. Embodiments of the PTT communication system 100 solve this problem of distortion and/or loss in the voice communication that is heard by the listener.

The comfort tone system 200, in response to receiving information identifying one or more corrupted, lost or delayed voice packets, initiates a halting of the draining (passing) of individual voice packets (or the corresponding digitized portions of the voice communication) from the jitter buffer 310 to the vocoder 312. During this halting of the flow of individual voice packets (or the corresponding digitized portions of the voice communication) out from the jitter buffer 310, several novel actions occur.

Later received voice packets are processed by the packetizer 308 and passed into the memory of the jitter buffer 310. Since the halting of the jitter buffer 310 may last for a relatively long duration, such as several hundred milliseconds or more, embodiments may employ a relatively larger jitter buffer 310 than that used by legacy PTT devices.

Alternatively, or additionally, a supplemental memory 332 may be employed to temporarily store later received voice packets in the event that the memory of the jitter buffer 310 becomes full (and can no longer store additional received voice packets or the corresponding digitized portions of the voice communication). Such later received voice packets may then be passed from the supplemental memory 332 to the jitter buffer 310 after the comfort tone system 200 restarts the jitter buffer 310, which will then have additional room to store these later received voice packets.

Additionally, during this halting of the flow of individual voice packets (or the corresponding digitized portions of the voice communication) out from the jitter buffer 310, a comfort tone is generated by the comfort tone system 200. The generated comfort tone is emitted from the speaker 316 as an audible sound. The emitted comfort tone is heard by the listener, who then understands that there is an ongoing delay in receiving the voice communication from the speaker's PTT device 302.

In preferred embodiments, the comfort tone is a pleasing tonal sound, message, music, or the like. The comfort tone may be a pleasing sound that minimizes stress on the part of the listener. Further, the listener understands that when communication of the voice communication resumes, they will be receiving the entirety of the voice communication that will be gap free and/or error free. That is, the listener understands that they will eventually receive a perfect voice communication from their PTT device 302.

In the situation of corrupt, lost or delayed voice packets, which create null buffer portions in the jitter buffer 310, identification of the corrupted, lost or delayed voice packets is provided to the voice communications packet recovery system 300. The voice communications packet recovery system 300 is configured to retrieve corrupt, lost or delayed voice packets so that they may be replaced into the corresponding null buffer portions in the memory of the jitter buffer 310.

In practice, after the jitter buffer 310 has been filled with a predetermined minimum number or amount of good individual voice packets (or the corresponding digitized portions of the voice communication), operation of the jitter buffer 310 resumes and issuance the comfort tone is halted. For example, if the jitter buffer manager 318 halts the jitter buffer 310 because of delay in the receipt of voice packets from the packet-based communication system 102, operation of the jitter buffer 310 may resume after the delay ends or decreases to some predefined level, such that the incoming stream of later received voice packets is sufficient to fill the jitter buffer 310 with the minimum number of good individual voice packets (or the corresponding digitized portions of the voice communication). If one or more individual voice packets were corrupted or lost, then operation of the jitter buffer 310 may resume after the corrupted or lost voice packets have been replaced under operation of an embodiment of the voice communications packet recovery system 300.

Embodiments of the comfort tone system 200 may insert the comfort tone at any suitable location along the data stream within the listening portion 304 of the PTT device 302. In an example embodiment, the comfort tone is provided directly to the speaker 316 as an analog signal that is reproduced as the comfort tone. In an example embodiment, a looped or repeatable audio recording of the comfort tone may be stored in a suitable memory and communicated as needed to the speaker 316.

In another embodiment, digital information corresponding to the comfort tone is provided to the D/A converter 314. In an example embodiment, the digital information that is used to generate the comfort tone may be stored in a suitable memory and communicated as needed to the D/A converter 314. Accordingly, a continuous analog comfort tone is generated and passed from the D/A converter 314 to the speaker 316.

In some embodiments, individual comfort tone packets (or the corresponding digitized comfort tone portions) may be synthesized, such that the packet payload or the corresponding digitized portion may be used to generate the comfort tone. For example, a synthesized individual comfort tone packet (or the corresponding digitized comfort tone portion) may be stored in a suitable memory. The individual comfort tone packet is then repeatedly retrieved and communicated to the vocoder 312 during the duration of the halting of the operation of the jitter buffer 310. Accordingly, the vocoder 312 passes a digital comfort tone packet (or comfort tone portion) to the D/A converter 314 so that a continuous analog comfort tone is generated and passed from the D/A converter 314 to the speaker 316.

In some embodiments, individual comfort tone packets may be synthesized such that the packet payload or the corresponding digitized portion may be used to generate the comfort tone. For example, a synthesized comfort tone packet may be stored in a suitable memory, repeatedly retrieved and stored into the output queue portion of the memory of the jitter buffer 310 during the duration of the halting of the operation of the jitter buffer 310. In some embodiments, the synthesized individual voice packet (or the corresponding digitized portion) may be stored in a suitable location of the memory of the jitter buffer 310. Accordingly, the jitter buffer 310 continues to output the digital comfort tone packets to the vocoder 312, which are then passed to the D/A converter 314, so that a continuous analog comfort tone is generated and passed from the D/A converter 314 to the speaker 316.

In the various embodiments, after the corrupted, lost or delayed voice packets are replaced with valid replacement voice packets such that the memory of the jitter buffer 310 is properly filled, or at least filled to some predefined duration, with a complete and perfect voice message, then the comfort tone system 200 halts the comfort tone and issuance of the perfect voice communication resumes. In some embodiments, the jitter buffer 310 must be sufficiently filled (to at least the low water mark or the like) before issuance of the comfort tone is halted and issuance of the perfect voice communication resumes. Any suitable predefined duration may be used. In some embodiments, the predefined duration is greater than the low water mark by some predefined amount.

Operation of embodiments of the speaking portion 306 of the PTT device 302 is now described in greater detail. A talk event is initiated in response to the speaker actuating the talk button 108. As the speaker begins to talk, the microphone 320 detects the speech and outputs a corresponding analog voice communication signal to the A/D converter 322. That is, the microphone detects the voice communication spoken by a user of the PTT device 302.

The A/D converter 322 converts the received analog voice communication signal into a digital voice communication signal. The vocoder 324 parses out the received digital voice communication signal into discreet digital voice communication signal portions. The digital voice communication signal portions are then communicated from the vocoder 324 to the packetizer 326. The packetizer 326 encapsulates the discreet voice communication signal portions into individual voice packets.

An identifier is assigned to each generated voice packet that identifies the relative location of each particular voice communications packet in the voice communication. That is, the identifier identifies the sequence location of each of the parsed communication signal portions in the voice communication. The generated voice packets are then communicated from the packetizer 326 out into the packet-based communication system 102 using accepted packet-based communication protocols.

In some embodiments, the intended recipient PTT device 302 may also be identified with information included in each voice packet. This identity of the intended recipient PTT device may provide a measure of communication security and/or control. Encryption may also be used to provide additional security and/or control. In some embodiments, such as when multiple agency personnel from one or more government agencies are in communication with each other, multiple intended recipient PTT devices 302 may be identified.

Embodiments of the speaking portion 306 of the PTT device 302 include the voice packet buffer 330. The voice packets generated by the packetizer are communicated to the voice packet buffer 330. Each stored voice packet is a duplicate of the voice packets communicated out over the packet-based communication system 102 to the intended recipient PTT device(s) 302. Accordingly, each stored voice packet, which may be referred to herein as a replacement voice packet, is identified using the same identifier of the voice packets that are communicated out over the packet-based communication system 102.

Operation of embodiments of the voice communications packet recovery system 300 is now described in greater detail. As noted above, the identity of corrupt, lost or delayed voice packets, which result in null buffer portions in the memory of the jitter buffer 310, are identified at the listener's PTT device 106. Embodiments of the voice communications packet recovery system 300 generate a packet re-transmit request that is transmitted from the listener's PTT device 106 to the speaker's PTT device 104 (FIG. 1). The packet re-transmit request identifies the corrupt, lost or delayed voice packets using their respective identifier.

The identifiers of the corrupt, lost or delayed voice packets may be determined in a variety of manners. In an example embodiment, identifiers of valid voice packets that are adjacent to the null buffer portions in the memory of the jitter buffer 310 are retrieved and used as a reference to determine the identifier of the corrupt, lost or delayed voice packets.

When a speaker's PTT device 302 receives the packet re-transmit request with the identity of one or more voice packets that have been corrupted, lost or delayed by the listener's PTT device 302, the replacement voice packets identified with the corresponding identifiers in the packet re-transmit request are retrieved from the voice packet buffer 330 of the speaker's PTT device 302. The retrieved replacement voice packets are then retransmitted to the listener's PTT device 302.

When the requesting PTT device 302 receives the transmitted replacement voice packets, the jitter buffer manager 318 manages the insertion of the received replacement voice packets into their appropriate null buffer portion in the memory of the jitter buffer 310 based on the identifier of each replacement voice packet that identifies its respective location in the sequence of voice communication portions. Accordingly, a damaged or incomplete voice communication may be repaired.

During the period of time that the listener's PTT device 302 requests corrupt, lost or delayed voice packets, awaits delivery of the requested replacement voice packets, and then repairs the voice communication stored in the memory of the jitter buffer 310, embodiments of the comfort tone system 200 generate the comfort tone that is heard by the listener. That is, the audible comfort tone issued from the speaker of the listener's PTT device is ended after the current amount of voice communication information has been repaired with the voice communication portion of the replacement voice packet. Once the voice communication has been repaired using the received replacement voice packets identified in the packet re-transmit request, operation of the jitter buffer 310 may resume and issuance of the comfort tone may be stopped. Accordingly, the listener hears a perfect reproduction (an error-free voice communication) of the remainder of the speaker's voice conversation.

Figure 5:
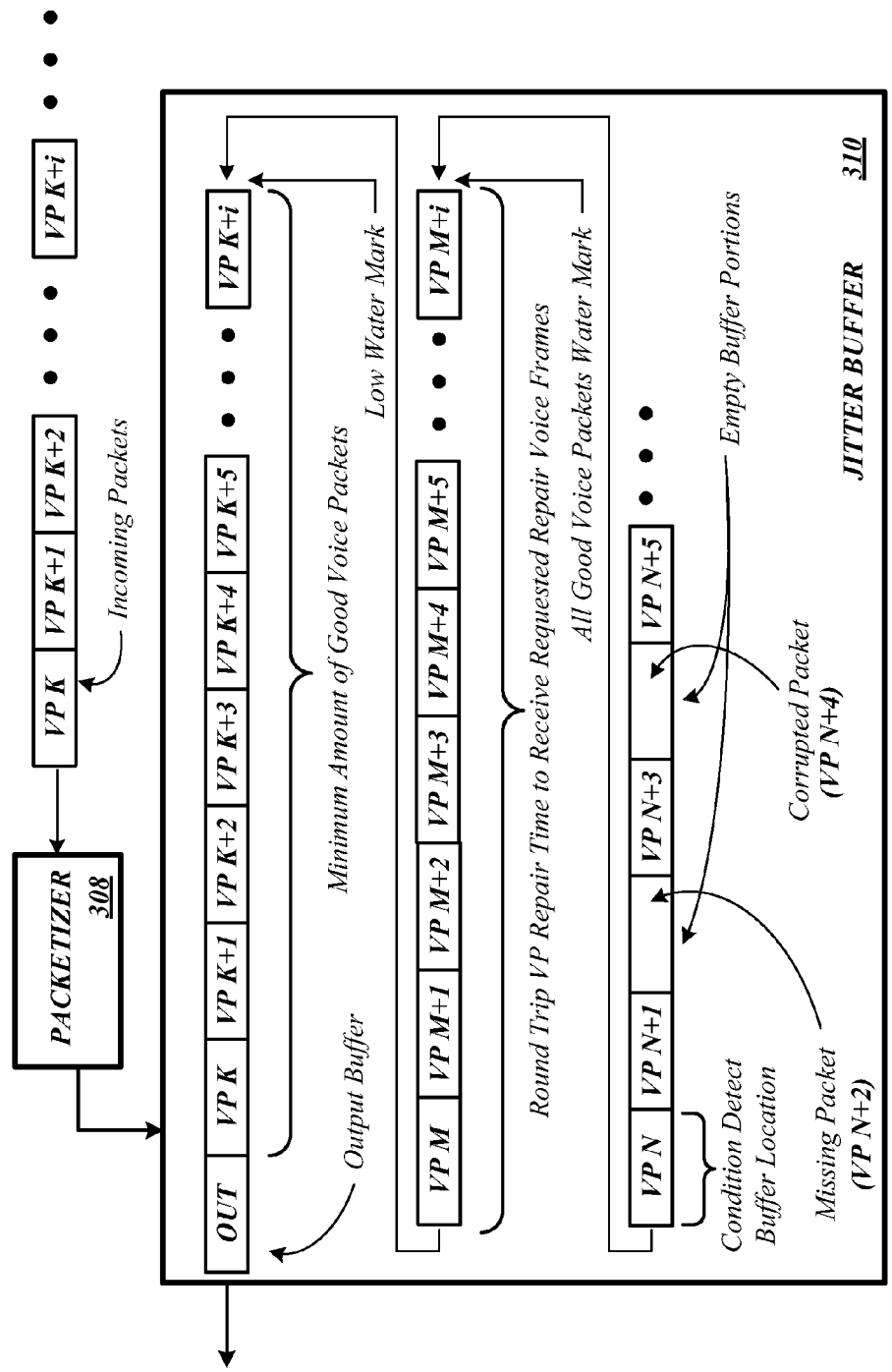
FIG. 5 is a conceptual diagram illustrating a stream of voice packets with empty buffer portions that are retrieved by embodiments of the voice communications packet recovery system.

FIG. 5 is a conceptual diagram illustrating a stream of voice packets with empty buffer portions that are retrieved by embodiments of the voice communications packet recovery system 300. As noted in the discussion of FIG. 4, the missing voice packet (VP N+2) and the corrupted voice packet (VP N+4) resulted in the jitter buffer 310 creating empty buffer portions. When the replacement voice packet corresponding to the missing voice packet (VP N+2) and the replacement voice packet voice packets corresponding to the corrupted voice packet (VP N+4) are retrieved from the voice packet buffer 330 of the originally transmitting PTT device 302, the empty buffer portions can be filled with the received replacement voice packets. Accordingly, a perfect voice communication will be presented to the listener after repair of the voice communication.

FIG. 5 conceptually illustrates an example portion of the memory of the jitter buffer 310, referenced as an output buffer (OUT). The voice packet (or the corresponding digitized portion of the voice communication) currently stored in the output buffer (OUT) is passed to the vocoder 312 in response to a control signal, such as, but not limited to, a clock signal. Once that current voice packet is moved out of the output buffer (OUT), all of the other stored voice packets shift (either physically or virtually) by one position in the jitter buffer 310. Thus, the voice packet (VP K) moves into the output buffer (OUT) positions, and so on.

FIG. 5 conceptually illustrates a location in the jitter buffer 310, referred to as a low water mark. The location of the low water mark corresponds to a minimum number of voice packets that must be currently stored in the jitter buffer 310 before the voice communication begins to be streamed out from the jitter buffer 310. Once the current portion of voice communication information reaches the low water mark, audible reproduction of the voice communication from the speaker of the listener's PTT device may begin (or continue).

Embodiments of the voice communications packet recovery system 300 ensure that the contents of these buffers [conceptually illustrated as voice packets (VP K) through (VP K+i)] are correct and error free. This minimum number of voice packets corresponds to a duration, size, and/or number of buffer portions in the jitter buffer 310 indicated by the "minimum amount of good voice packets" illustrated in FIG. 5. Any suitable error checking algorithm may be used to verify that received voice packets are correct and error free.

FIG. 5 further conceptually illustrates a round trip voice packet (VP) repair time may be determined for communications between the speaker's transmitting PTT device 302 and the receiving listener's PTT device 302. The round trip VP repair time corresponds to a duration that is required for the listener's PTT device 302 to transmit the packet re-transmit request to the speaker's PTT device 302, for the packet re-transmit request to be communicated over the intervening packet-based communication system 102, for the speaker's PTT device 302 to receive the packet re-transmit request and retrieve the requested replacement voice packets, for the replacement voice packets to be communicated from the speaker's PTT device 302 over the intervening packet-based communication system 102, and for the replacement voice packets to be received and then inserted into their associated empty buffer position in the jitter buffer 310 of the listener's PTT device 302. Alternative embodiments may define the round trip voice packet repair time in other manners, and/or may include a margin duration. The round trip voice packet repair time may be determined based on historical measured round trip time performance, may be based on a predefined value, or may be estimated, depending upon the embodiment. Further, the round trip voice packet repair time may be dynamically adjusted based on changing operating conditions that may change the voice packet transmit times over the intervening packet-based communication system 102.

FIG. 5 conceptually illustrates an "all good voice packets water mark" that denotes a location in the jitter buffer 310 wherein all voice packets [from (VP K) through (VP M+i)] will be good voice packets (or the corresponding digitized portions of the voice communication). That is, all voice packets (or the corresponding digitized portions of the voice communication) that have advanced in the jitter buffer 310 beyond the "all good voice packets water mark" location will be valid (not corrupted).

The duration, size, and/or number of buffer positions for the good voice packets in the jitter buffer 310 corresponds, at a minimum, to the sum of the duration, size, and/or number of buffer positions associated with the illustrated "minimum amount of good voice packets" and the illustrated "round trip voice packet repair time." Accordingly, the location of the "all good voice packets water mark" in the jitter buffer 310 indicates this duration, size, and/or number of buffer positions good voice packets (or the corresponding digitized portions of the voice communication) that have been stored in the memory of the jitter buffer 310. Alternative embodiments may define this minimum duration, size, and/or number of buffer positions of good voice packets (or the corresponding digitized portions of the voice communication) in other manners, and/or may include a margin duration.

FIG. 5 conceptually illustrates a "condition detect buffer location" wherein embodiments of the comfort tone system 200 and/or the voice communications packet recovery system 300 check contents of a buffer position in the jitter buffer 310 to verify that the voice packet (or the corresponding digitized portions of the voice communication) is not empty. As noted above, a lost, delayed or corrupted voice packet results in insertion of an empty buffer position in the memory of the jitter buffer 310. Accordingly, as long as a buffer portion at the "condition detect buffer location" is not empty, then at the next cycle, the contents of this particular buffer position [conceptually illustrated as (VP N) in FIG. 5] will shift (physically or virtually) into the region indicated as the "round trip voice packet repair time" in FIG. 5.

For example, a first empty buffer position is conceptually illustrated between the voice packets (VP N+1) and (VP N+3). Returning to the above described hypothetical example of FIG. 4, the first empty buffer position was caused by the loss of the voice packet (VP N+2). A second empty buffer position is conceptually illustrated between the voice packets (VP N+3) and (VP N+5). Returning to the above described hypothetical example of FIG. 4, the second empty buffer position was caused by the corruption of the voice communication portion of the voice packet (VP N+4).

After two cycles of voice packets (or the corresponding digitized portions of the voice communication) through the jitter buffer 310, the first empty buffer position will then be at the "condition detect buffer location" illustrated in FIG. 5. Accordingly, the need to repair the voice communications with the replacement voice packet (VP N+2) will be determined, and a suitable packet re-transmit request for the replacement voice packet (VP N+2) will be communicated from the listener's PTT device 302 to the speaker's PTT device 302. As cycling of voice packets through the jitter buffer 310 continues, the replacement voice packet corresponding to the missing voice packet (VP N+2) will have been received at the listener's PTT device 302 (since the replacement voice packet is received within the associated the round trip voice packet repair time). When the replacement voice packet (VP N+2) is recovered, the replacement voice packet (VP N+2) is then inserted into its correct position in the jitter buffer 310 such that a perfect voice communication is available to the listener.

Continuing with the above described example, after two more cycles of voice packets through the jitter buffer 310, the second empty buffer position will be at the condition detect buffer location. Accordingly, the need to repair the voice communications with the replacement voice packet (VP N+4) will be determined, and a suitable packet re-transmit request for the replacement voice packet (VP N+4) may be communicated from the listener's PTT device 302 to the speaker's PTT device 302. When the replacement voice packet (VP N+4) is recovered, the replacement voice packet (VP N+4) is then inserted into its correct position in the jitter buffer 310 such that a perfect voice communication is available to the listener.

In some embodiments, the condition detect buffer location may be defined as a larger duration, a larger size, or a greater number of buffer positions in the jitter buffer 310. Accordingly, embodiments may periodically check for one or more empty buffer positions in the jitter buffer 310 at one time. For example, but not limited to, the condition detect buffer location could be expanded to include the example buffer positions associated with voice packets (VP N) through (VP N+5). Accordingly, a check cycle or the like, needs to be performed every fifth or sixth cycle of the jitter buffer 310. In this situation, both the first and the second empty buffer positions would be detected. A single packet re-transmit request identifying both the missing voice packets (VP N+2) and (VP N+4) would be sent from the listener's PTT device 302 to the speaker's PTT device 302. Any suitable size of the region for detecting empty buffer positions in the jitter buffer 310 may be employed by the various embodiments.

Further, the size of the region for detecting empty buffer positions in the jitter buffer 310 may be dynamically adjustable. For example, if the error rate is low, the size of the region for detecting empty buffer positions in the jitter buffer 310 may be relatively large. If error rates increase such that more voice packets are lost, corrupted, or delayed at a higher frequency, the size of the region for detecting empty buffer positions in the jitter buffer 310 may be reduced so that the periodic checks are performed more frequently. Such embodiments may be more computationally efficient and/or require less communication system bandwidth (since it is likely that fewer numbers of packet re-transmit requests packet re-transmit requests would be required to maintain a perfect voice communication in the jitter buffer 310).

It is appreciated from FIG. 5 that the missing voice packet (VP N+2) may be simply delayed (rather than lost). If the missing voice packet (VP N+2) is delivered to the listener's PTT device 302 within the next cycle of the jitter buffer 310, then the delayed voice packet (VP N+2) can then be inserted into the first empty buffer position in the jitter buffer 310. Accordingly, at the next cycle, the condition check will detect the presence of the voice packet (VP N+2) such that a packet re-transmit request will not be needed.

In some situations, the delay in repairing the voice communications by retrieving missing voice packets may require a temporary halting of operation (cycling) of the jitter buffer 310, so that time is available to fill any empty buffer positions in the jitter buffer 310 with replacement voice packets that are received from the speaker's PTT device 302. In such situations, embodiments of the comfort tone system 200 emit the comfort tone that is heard by the listener while embodiments of the voice communications packet recovery system 300 are recovering the missing voice packets.

In some embodiments, the contents of the voice packets (or the corresponding digitized portions of the voice communication) residing downstream of the "all good voice packets water mark" may be evaluated to identify a desirable place to halt operation of the jitter buffer 310. For example, if one or more voice packets (or the corresponding digitized portions of the voice communication) indicate no speech (silence), it is likely that the speaker has paused their conversation, such as when at the end of a spoken sentence. Such embodiment may continue to drain the jitter buffer 310 up to a point when the identified "silence" voice packets (or the corresponding digitized portions of the voice communication) are reached at the output buffer. The operation of the jitter buffer 310 can then be halted. Thus, the listener hears the last sentence of the speaker. The comfort tone, now inserted in between whole sentences, is less distracting to the listener.

In the various embodiments of the jitter buffer 310, the size and/or duration is preferably larger than 300 milliseconds. In some embodiments, the size and/or duration of the jitter buffer 310 may be dynamically adjusted to accommodate changing conditions of the intervening packet-based communication system 102. For example, but not limited to, the size and/or duration of the jitter buffer 310 may be increased in response to increasing voice packet transmission delay times of the voice packets being communicated over the intervening packet-based communication system 102. Alternatively, or additionally, the size and/or duration of the jitter buffer 310 may be increased in response to increasing voice packet error rates. Conversely, if delay times decrease or if error rates improve, the size and/or duration of the jitter buffer 310 may be decreased. In an example embodiment, the duration, size, and/or number of buffer positions in the "minimum amount of good voice packets" and/or the "round trip voice packet repair time" illustrated in FIG. 5 may be dynamically adjusted as noted above.

Further, it is appreciated that individual delay times in communication of individual voice packets through the intervening packet-based communication system 102 are cumulative. Thus, if a single talk session lasts a relatively long time, such that the cumulative duration of the delay times exceeds some predefined threshold, the size and/or duration of the jitter buffer 310 may be dynamically increased to accommodate the increasing cumulative delay time. In an example embodiment, the duration, size, and/or number of buffer positions in the "minimum amount of good voice packets" and/or the "round trip voice packet repair time" illustrated in FIG. 5 may be dynamically adjusted.

In some embodiments, the packet re-transmit request issued by the listener's PTT device 302 may not be responded to, such as when the packet re-transmit request is lost or corrupted. That is, the missing voice packets identified in the packet re-transmit request may not be received at the listener's PTT device 302 within some predefined duration threshold. This duration threshold would be at least equal to, but preferably larger than, the above-described "round trip voice packet repair time" illustrated in FIG. 5. In situations where the requested replacement voice packets are not received at the listener's PTT device 302 within the duration threshold, the packet re-transmit request may be repeated (retransmitted) from the listener's PTT device 302. Alternatively, or additionally, the repeated packet re-transmit request may include the identifiers of subsequently identified missing voice packets and/or may omit any missing voice packets that have been received by the time the repeated packet re-transmit request is issued.

In some embodiments, a message or the like (such as the packet re-transmit request) may be periodically communicated from the listener's PTT device 302 to the speaker's PTT device 302. In such embodiments, the speaker's PTT device 302 will be able to assess the current quality of service of communications between the listener's PTT device 302 and the speaker's PTT device 302. As described in greater detail herein, some embodiments of the perfect voice communication delivery confirmation system 400 may employ these periodic communications to estimate the time of a confirmation tone or the like that is provided to the speaker after release of the talk button on the speaker's PTT device 302.

In a system configuration wherein the speaker's PTT device 302 is communicating to a plurality of different listener's PTT devices 302, the speaker's PTT device 302 may be configured to respond to specific packet re-transmit requests from any one of the individual listener's PTT devices 302 have indicated a need for one or more replacement voice packets. It is appreciated that in some situations, such as when one of the plurality of listener's PTT devices 302 has failed, and/or has become connected to an inoperative portion of the intervening packet-based communication system 102, that the speaker's PTT device 302 cannot continue indefinitely to provide replacement voice packets. Accordingly, after some predefined maximum duration, the speaker's PTT device 302 no longer responds to packet re-transmit requests from that particular listener's PTT device 302.

Operation of embodiments of the perfect voice communication delivery confirmation system 400 is now described in greater detail. As noted above, corrupt, lost or delayed voice packets may result in delay of the communication of a perfect voice communication to the listener. Embodiments of the comfort tone system 200 emit a comfort tone that is heard by the listener to indicate that a perfect voice communication is being delivered to their PTT device 302.

Embodiments of the perfect voice communication delivery confirmation system 400 generate audible confirmation information that is heard by the speaker such that the speaker understands that their voice communication has been perfectly delivered to and heard by the listener. In an example embodiment, the audio confirmation information is provided to the speaker in response to the speaker releasing the talk button 108 at the end of their talk session. Accordingly, the speaker does not become worried or concerned that the listener has not received the voice communication, and/or that the listener is not responding to the voice communication.

Some embodiments may emit other types of confirmation, such as a visible confirmation that is seen by the speaker. An example embodiment emits light from a light source (or ceases light emission). Alternatively, or additionally, an embodiment may present of a visual message on a display of the speaker's PTT device 302. Alternatively, or additionally, some embodiments may provide a tactile confirmation (such a vibration or other suitable motion of the speaker's PTT device 302) that is sensed by the speaker.

The perfect voice communication delivery confirmation system 400 in the speaker's PTT device 302 may determine that the voice communication has been perfectly delivered to and heard by the listener in a variety of manners. In some embodiments, the listener's PTT device 302, upon determining that the current talk session at the speaker's PTT device 302 has concluded, transmits a voice communication confirmation signal, message, or the like back to the speaker's PTT device 302 to indicate that the voice communication has been perfectly delivered to and heard by the listener.

In some embodiments, the listener's PTT device 302 determines that the current talk session has ended, such as in response to the speaker releasing the talk button 108. Such embodiments of the speaker's PTT device 302 are configured to transmit an end of talk session or other message to the speaker's PTT device 302. Some embodiments of the speaker's PTT device 302 include end of talk information in the last communicated voice packet, such as a flag or other suitable indicia. For example, the flag or the like, may be included in the packet control information, such as the packet header or at the end of the voice packet. In response to receiving the signal or information that indicates that the current talk session has concluded, the listener's PTT device 302 determines that the voice communication has been perfectly delivered to and heard by the listener, and in response thereto, generates and transmits the voice communication confirmation signal, message, or the like back to the speaker's PTT device 302.

Alternatively, or additionally, some embodiments of the listener's PTT device 302 are configured to monitor for a cessation of incoming voice packets. After a predefined duration of no newly received voice packets from the speaker's PTT device 302, such embodiments determine that the current talk session has concluded. After the listener's PTT device 302 determines that the voice communication has been perfectly delivered to and heard by the listener, the listener's PTT device 302 generates and transmits the voice communication confirmation signal, message, or the like to the speaker's PTT device 302.

Some embodiments of the speaker's PTT device 302 may be configured to independently determine that the voice communication has been perfectly delivered to and heard by the listener. In an example embodiment, the speaker's PTT device 302 monitors for an incoming packet re-transmit request from the listener's PTT device 302 after the last voice packet has been communicated out from the speaker's PTT device 302. If a packet re-transmit request is not received within some predefined duration, the speaker's PTT device 302 concludes that the voice communication has been perfectly delivered to and heard by the listener. The predefined duration may be determined based on a sum of the time for transmission of the last voice packet over the intervening packet-based communication system 102 (including any delays caused by congestion or the like), an amount of time that is required for the listener's PTT device 302 to determine whether the last voice packet has successfully arrived, and a time period for the packet re-transmit request, if sent, to be communicated from the listener's PTT device 302 to the speaker's PTT device 302 over the intervening packet-based communication system 102 (including any delays caused by congestion or the like). These various times may be determined based on design parameters or historical performance, and/or may be estimated.

Further, one or more of these time periods may be dynamically adjusted depending upon a variety of factors. For example, voice packet delay times through the intervening packet-based communication system 102 may change over time such that one or more of the periods for voice packet communications through the packet-based communication system 102 are adjusted. Alternatively, or additionally, the different types of listener's PTT devices 302 may have different times for determining that the last communicated voice packet has successfully arrived (or has been corrupted/lost). Accordingly, this time may be changed depending upon the particular type of listener's PTT device 302.

In some embodiments, the listener's PTT device 302 periodically transmits information back to the speaker's PTT device 302 indicating actual current delay times for voice packets over the intervening packet-based communication system 102. Thus, if traffic conditions over the intervening packet-based communication system 102 change, and when such voice packet delay time changes are detected by the listener's PTT device 302, the changing voice packet delay time information may be communicated back to the speaker's PTT device 302.

In some embodiments, the perfect voice communication delivery confirmation system 400 is configured to prevent a next talk session from being initiated by the speaker until a confirmation that voice communication has been perfectly delivered to and heard by the listener. Some embodiments may be configured to disable the talk function of the speaker's PTT device 302 and/or to lock the talk button 108 to prevent initiation of a subsequent talk event.

In a system topology wherein the speaker's PTT device 302 is communicating to a plurality of different listener's PTT devices 302, the speaker's PTT device 302 may be disabled from initiating a subsequent talk session until all of, or most of, the receiving listener's PTT devices 302 have indicated that the voice communication has been perfectly delivered to and heard by the listener. Alternatively, or additionally, a suitable duration may be used that is sufficient to provide time for all of the different listener's PTT devices 302 to provide their respective perfect voice communication to their respective listener.

It is appreciated that in some situations, one of the plurality of listener's PTT devices 302 may have failed, and/or may have become communicatively connected to an inoperative portion of the intervening packet-based communication system 102. One skilled in the art understands that the disablement of the speaker's PTT device 302 cannot continue indefinitely. Accordingly, some embodiments are configured with a maximum threshold duration, after which time, the speaker's PTT device 302 is permitted to initiate a subsequent talk session.

Legacy PTT devices, at the conclusion of a talk session, are configured to emit a short duration high tone sound (defined by a relatively high pitch) that is immediately followed by a short duration low tone sound (defined by a relatively low pitch). The high/low tone pattern is heard by the speaker. When the speaker hears high/low tone pattern, the speaker understands that their current talk session has been properly released by the PT system.

In some embodiments, the perfect voice communication delivery confirmation system 400 is configured to modify one or more of the durations of the high/low tones. In an example embodiment, the duration of the emitted high tone is extended until confirmation is received that the voice communication has been perfectly delivered to and heard by the listener. Once the perfect delivery has been confirmed, the emitted tone from the speaker's PTT device 302 transitions to the short duration low tone. The extended duration of the high tone indicates to the speaker that the transmission of voice packets (and likely one or more replacement voice packets) is still underway. When the transition from the high tone to the low tone occurs, the speaker understands that the current talk session has concluded.

Other audible indications may be used by alternative embodiments of the perfect voice communication delivery confirmation system 400. For example, a third different pitch tone may be used to indicate that the current voice communication process is still underway. Alternatively, or additionally, some embodiments may issue a different tone pattern, such as beeping or the like, to indicate that the current voice communication process is still underway. The different tone pattern may be defined by different tone pitches, intermittent tone pitches, and/or one or more different tone transitions. In such embodiments, the traditional high/low tone pattern may be optionally used at the conclusion of the current voice communication process to indicate to the speaker that the current talk session has successfully been completed. In some embodiments, the tone pattern may be similar to, or the same as, the comfort tone.

Some embodiments of the perfect voice communication delivery confirmation system 400 may include an audible spoken message that is heard by the user. Alternatively, or additionally, some embodiments may emit music or the like to indicate to the speaker that the current voice communication process is still underway.

Some embodiments of the listening portion 304 of the PTT device 302, upon detecting the first incoming voice packet signifying the initiation of a voice communication, may emit the comfort tone or another audible indicator that is heard by the listener. When the jitter buffer 310 has filed to the high water mark such that the voice communication begins to be reproduced, presentation of the comfort tone or other audible indicator ceases. Thus, the listener appreciates that an incoming voice communication is forthcoming. In some embodiments, an audible, tactile, or visible indication may be provided from the PTT device 302 so that the user understands that they are in communication with a legacy PTT device.

FIGS. 6A and 6B are conceptual illustrations of timelines of a voice conversation provided by embodiments of the PTT communication system 100. FIG. 6A conceptually illustrates the speaker's voice communication (as a sinusoidal wave of two periods). When the speaker releases the talk button 108 (FIGS. 1 and 2) to signify the end of the talk session, an audible acknowledgement is issued for a period of T1+T2, which corresponds to the initial network delay time T1 and any delays associated with delayed, corrupted or lost voice packets that are replaced with replacement voice packets.

FIG. 6B conceptually illustrates that presentation of the speaker's voice communication begins after the initial network delay time T1. For some duration (conceptually illustrated as the first period of the sinusoidal wave), one or more voice packets are understood to have been delayed, corrupted or lost. Accordingly, the comfort tone is emitted from the listener's PTT device 302. At some point in time, conceptually illustrated by the period T2, the voice communication has been repaired with received replacement voice packets. Then, presentation of the voice communication resumes (conceptually illustrated as the second period of the sinusoidal wave).

Embodiment of the PTT device 302 may be configured to communicate with legacy PTT devices. In such situations, the PTT device does not issue comfort tones, request replacement voice packets, or send/receive delivery confirmations.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method of communicating voice communications between push to talk (PTT) devices via an intervening packet-based communication network, the method comprising:
   receiving voice packets at a listener's PTT device,
      wherein each received voice packet is one of a serial ordered sequence of voice packets,
      wherein each voice packet corresponds to a portion of the voice communication, and
      wherein each voice packet includes an identifier that identifies the relative position of that particular voice communication packet in the serial ordered sequence of voice packets,
   storing the received voice packets in an order defined by the identifier at the listener's PTT device,
   determining at the listener's PTT device when a predefined amount of voice communication information has been received and stored, wherein the predefined amount of voice communication information is complete and perfect; and
   while the predefined amount of voice communication information is being received and stored, generating an audible first comfort tone from a speaker residing in the listener's PTT device,
   after the predefined amount of voice communication information has been received and stored, initiating presentation of the voice communication on the listener's PTT device using the received predefined amount of voice communication information and ending generation of the first comfort tone;
   generating a second comfort tone at the listener's PTT device when communication of the voice communication is paused due to at least one delayed, corrupted or lost voice packet transmitted from a speaker's PTT device, wherein the at least one delayed, corrupted or lost voice packet includes a voice communication portion of the of the voice communication;
   communicating a packet re-transmit request from the listener's PTT device to the speaker's PTT device, wherein the packet re-transmit request identifies the at least one delayed, corrupted or lost voice packet;
   receiving at least one replacement voice packet that is communicated from the speaker's PTT device to the listener's PTT device, wherein a voice communication portion of the replacement voice packet is the same as the voice communication portion of the at least one delayed, corrupted or lost voice packet;
   repairing the voice communication with the voice communication portion of the replacement voice packet; and
   in response to repairing the voice communication, the method further comprising:
      ending generation of the second comfort tone from the listener's PTT device; and
      ending the pause of the voice communication at the listener's PTT device.

2. The method of claim 1, further comprising:
   communicating a confirmation signal from the listener's PTT device to the speaker's PTT device in response to repairing the voice communication,
   wherein the confirmation signal indicates that a perfect voice communication to the listener has been completed at the listener's PTT device.

3. The method of claim 1, wherein the first comfort tone and the second comfort tone are an audible comfort tone that is heard by the user of the listener's PTT device.

4. The method of claim 1, wherein the predefined amount of voice communication information is based on a round trip voice packet (VP) repair time, wherein the VP repair time is defined as a sum of at least the following durations:
   a duration that is required for the listener's PTT device to transmit the packet re-transmit request to the speaker's PTT device over the intervening packet-based communication network,
   a duration that is required for the speaker's PTT device to receive the packet re-transmit request,
   a duration that is required for the speaker's PTT device to retrieve the requested replacement voice packet from a memory medium at the speaker's PTT device,
   a duration that is required for the replacement voice packet to be communicated from the speaker's PTT device to the listener's PTT device over the intervening packet-based communication network, and
   a duration that is required for the listener's PTT device to repair the voice communication using the received replacement voice packet.

5. The method of claim 1, further comprising:
   identifying an occurrence of the at least one delayed, corrupted or lost voice packet,
   wherein the packet re-transmit request is communicated from the listener's PTT device to the speaker's PTT device in response to identifying the occurrence of the at least one delayed, corrupted or lost voice packet.

6. A method of receiving packet-based voice communications at a listener's push to talk (PTT) device, wherein the voice communications are generated by a speaker's PTT device, and wherein the voice communications are communicated in a series of voice packets via an intervening packet-based communication network, the method comprising:
   receiving the voice packets at the listener's PTT device, wherein each received voice packet is one of a serially ordered sequence of voice packets,
   wherein each voice packet corresponds to a unique portion of a voice communication generated by the speaker's PTT device, and
   wherein each voice packet includes an identifier that identifies a relative position of that particular voice packet in the serially ordered sequence of voice packets;
   storing, at the listener's PTT device, the received voice packets in an order defined by the identifier;
   determining, at the listener's PTT device, when an initial part of the voice communication defined by a predefined amount of voice communication information has been received and stored, wherein the predefined amount of voice communication information is complete and perfect;
   while the predefined amount of voice communication information is being received and stored, generating an audible first comfort tone from a speaker residing in the listener's PTT device;
   after the predefined amount of voice communication information has been received and stored, the method further comprising:
   ending the audible first comfort tone from the speaker of the listener's PTT device; and
   generating an audible reproduction of the voice communication from the speaker, wherein the generated audible reproduction of the voice communication corresponds to the complete and perfect predefined amount of voice communication information
   after generating the audible reproduction of the voice communication from the speaker of the listener's PTT device, the method further comprising:
   continuing to receive voice packets corresponding to later portions of the voice communication;
   identifying, at the listener's PTT device, an occurrence of at least one delayed, corrupted or lost voice packet in the received voice packets associated with the predefined amount of voice communication information;
   determining an identifier of the at least one delayed, corrupted or lost voice packet;
   communicating a packet re-transmit request from the listener's PTT device to the speaker's PTT device, wherein the packet re-transmit request includes the identifier of the at least one delayed, corrupted or lost voice packet;
   receiving at least one replacement voice packet that is communicated from the speaker's PTT device to the listener's PTT device in response to the packet re-transmit request, wherein a voice communication portion of the replacement voice packet is the same as a voice communication portion of the at least one delayed, corrupted or lost voice packet; and
   repairing the voice communication with the voice communication portion of the replacement voice packet,
   wherein a current amount of voice communication information is complete and perfect after the replacement voice packet is stored and received.

7. The method of claim 6, further comprising: communicating a confirmation signal from the listener's PTT device to the speaker's PTT device, wherein the confirmation signal indicates that at least the current amount of voice communication information is complete and perfect.

8. The method of claim 6, further comprising: generating an audible second comfort tone from the speaker residing in the listener's PTT device; and
   ending the audible second comfort tone from the speaker of the listener's PTT device after the current amount of voice communication information has been repaired with the voice communication portion of the replacement voice packet.

9. The method of claim 6, wherein the predefined amount of voice communication information is defined based on a first amount of time corresponding to anticipated delays in communication of voice packets over the intervening packet-based communication network, plus a second amount of time associated with communicating the packet re-transmit request from the listener's PTT device to the speaker's PTT device, and plus a third amount of time associated with receiving the at least one replacement voice packet that is communicated from the speaker's PTT device to the listener's PTT device.

10. The method of claim 6, wherein receiving voice packets at the listener's PTT device further comprises:
    receiving a last voice packet at the listener's PTT device, wherein the last voice packet is a last one of the serial ordered sequence of voice packets in the voice communication;
    determining that an entirety of a perfect voice communication to the listener has been received at the listener's PTT device; and
    communicating a confirmation signal from the listener's PTT device to the speaker's PTT device, wherein the confirmation signal indicates that the perfect voice communication to the listener has been received at the listener's PTT device.

11. The method of claim 6, wherein the predefined amount of voice communication information is based on a round trip voice packet (VP) repair time.

12. The method of claim 6, wherein the predefined amount of voice communication information is based on a round trip voice packet (VP) repair time, wherein the VP repair time is defined as a sum of at least the following durations:
- a duration that is required for the listener's PTT device to transmit the packet re-transmit request to the speaker's PTT device over the intervening packet-based communication network,
- a duration that is required for the speaker's PTT device to receive the packet re-transmit request,
- a duration that is required for the speaker's PTT device to retrieve the requested replacement voice packet from a memory medium at the speaker's PTT device,
- a duration that is required for the replacement voice packet to be communicated from the speaker's PTT device to the listener's PTT device over the intervening packet-based communication network, and
- a duration that is required for the listener's PTT device to repair the voice communication using the received replacement voice packet.

13. A method of communicating packet-based voice communications from a speaker's push to talk (PTT) device to a listener's PTT device, wherein the voice communications are communicated via an intervening packet-based communication network, the method comprising:
- receiving, at the speaker's PTT device, a voice communication from a user of the speaker's PTT device;
- generating, at the speaker's PTT device, a digital voice signal from the received voice communication;
- parsing, at the speaker's PTT device, the digital voice signal into a serially ordered sequence of discreet digital voice signal portions; and
- encapsulating, at the speaker's PTT device, each of the serially ordered sequence of discreet digital voice signal portions into a corresponding voice packet,
  - wherein each of the voice packets are arranged in a serially ordered sequence of voice packets that correspond to the serially ordered sequence of discreet digital voice signal portions, and
  - wherein each voice packet is identified by a unique identifier that identifies the relative position of the voice packet in the serially ordered sequence of voice packets;
- communicating each of the voice packets from the speaker's PTT device to the listener's PTT device via the intervening packet-based communication network; and
- storing, at the speaker's PTT device, each of the voice packets as a replacement voice packet, wherein each replacement voice packet has the same identifier as its corresponding voice packet that is communicated from the speaker's PTT device to the listener's PTT device;
- wherein after a last voice packet has been communicated from the speaker's PTT device corresponding to an ending of the voice communication from the user of the speaker's PTT device, the method further comprising:
- receiving a confirmation from the listener's PTT device that an entirety of the plurality of voice packets have been received at the listener's PTT device such that a perfect voice communication to the listener has been received at the listener's PTT device;
- generating audible confirmation information that is communicated to the user of the speaker's PIT device,
  - wherein the audible confirmation information indicates that the entirety of the plurality of the voice packets have been received at the listener's PTT device such that the perfect voice communication to the listener has been received at the listener's PTT device, and
  - wherein the perfect voice communication is the same as the voice communication received from the user of the speaker's PTT device.

14. The method of claim 13, wherein the audible confirmation information that is communicated to the user of the speaker's PTT device is generated after a packet re-transmit request from the listener's PTT device has not been received at the speaker's PTT device within a predefined duration.

15. The method of claim 13, further comprising:
- determining an end of the voice communication from the user of the speaker's PTT device;
- preventing an initiation of a new voice communication from the user of the speaker's PTT device until after confirmation information is communicated to the user of the speaker's PTT device,
- wherein the confirmation information indicates that an entirety of the plurality of voice packets have been received at the listener's PTT device such that a perfect voice communication to the listener has been received at the listener's PTT device.

16. The method of claim 13, further comprising:
- receiving a packet re-transmit request from the listener's PTT device identifying a previously communicated voice packet,
  - wherein the previously communicated voice packet corresponds to an occurrence of at least one delayed, corrupted or lost voice packet at the listener's PTT device, and
  - wherein the previously communicated voice packet is identified by the same identifier of a stored replacement voice packet associated with the previously communicated voice packet;
- retrieving, at the speaker's PTT device, the stored replacement voice packet having the same unique identifier as the unique identifier of the previously communicated voice packet; and
- communicating the retrieved replacement voice packet from the speaker's PTT device to the listener's PTT device, wherein the replacement voice packet includes the identifier of the at least one delayed, corrupted or lost voice packet,
- wherein the listener's PTT device is configured to repair the voice communication using the replacement voice packet.

17. A push to talk (PTT) device, wherein a plurality of PTT devices are configured to communicate packet-based voice communications from a speaker's PTT device to at least one listener's PTT device, and wherein the voice communications are communicated via an intervening packet-based communication network, each PTT device comprising:
- a listening portion configured to receive a plurality of first voice packets corresponding to a first voice communication spoken by a user of another PTT device, the listening portion comprising:
  - a first packetizer configured to receive the plurality of first voice packets,
    - wherein the plurality of first voice packets comprise digitized portions of the first voice communication, and wherein each of the plurality of first voice packets include a unique identifier that identifies the relative position of that particular voice packet in a serial ordered sequence of first voice packets;

a jitter buffer communicatively coupled to the first packetizer,
  wherein the jitter buffer is configured to receive the plurality of first voice packets from the first packetizer, and
  wherein the jitter buffer is configured to store the received plurality of first voice packets in the serial ordered sequence according to the identifier of each one of the received plurality of first voice packets;

a first vocoder communicatively coupled to the jitter buffer,
  wherein the first vocoder is configured to deconstruct each of the plurality of first voice packets received from the jitter buffer into digital data that corresponds to the digitized portion of the first voice communication;

a digital to analog (D/A) converter communicatively coupled to the first vocoder,
  wherein the D/A converter is configured to convert the received digital data into an analog portion of the first voice communication; and a speaker communicatively coupled to the D/A converter,
  wherein the speaker is configured to generate sound corresponding to an analog portion of the first voice communication that is heard by the listener; and a jitter buffer manager controllably coupled to the jitter buffer, wherein the jitter buffer manager is configured to:
  identify an occurrence of at least one delayed, corrupted or lost first voice packet in the received plurality of first voice packets;
  determine an identifier of the at least one delayed, corrupted or lost first voice packet;
  generate a packet re-transmit request that is communicated from the listener's PTT device to the speaker's PTT device,
    wherein the packet re-transmit request includes the identifier of the at least one delayed, corrupted or lost first voice packet,
    wherein at least one replacement voice packet that is communicated from the speaker's PTT device to the listener's PTT device is received by the first packetizer,
    wherein a voice communication portion of the replacement voice packet is the same as a voice communication portion of the at least one delayed, corrupted or lost first voice packet; and
  store the replacement voice packet into the jitter buffer at a location where the at least one delayed, corrupted or lost first voice packet is missing from the serial ordered plurality of first voice packets, such that the first voice communication is repaired with the replacement voice packet,
  wherein a currently stored portion of voice communication information is complete and perfect after the replacement voice packet is stored in the jitter buffer; and a speaking portion configured to process a second voice communication spoken by a user of the PTT device, the speaking portion comprising:

a microphone configured to detect the second voice communication spoken by the user of the PTT device,
    wherein the microphone is configured to generate analog voice information from the detected second voice communication;
  an analog to digital (A/D) converter communicatively coupled to the microphone,
    wherein the A/D converter is configured to convert the detected second voice communication from the generated analog voice information into digital voice information;
  a second vocoder communicatively coupled to the A/D converter,
    wherein the second vocoder is configured to parse out the converted digital voice communication information into discreet digital voice communication information portions;
  a second packetizer communicatively coupled to the second vocoder,
    wherein the second packetizer is configured to encapsulate the discreet digital voice communication information portions into a plurality of second voice packets that are communicated to the other PTT device, and
    wherein the plurality of second voice packets are communicated to the other PTT devices; and
  a voice packet buffer communicatively coupled to the second packetizer,
    wherein the voice packet buffer is configured to store each of the second voice packets received from the second packetizer as a corresponding replacement voice packet, wherein each replacement voice packet has the same identifier as its corresponding second voice packet; and a voice packet recovery system communicatively coupled to the voice packet buffer of the speaking portion, wherein the voice packet recovery system is configured to:
  identify a stored replacement voice packet based on a packet re-transmit request that has been received from the other PTT device,
    wherein the packet re-transmit request identifies a previously communicated second voice packet,
    wherein the previously communicated second voice packet corresponds to an occurrence of at least one delayed, corrupted or lost second voice packet at the other PTT device, and
    wherein the previously communicated second voice packet is identified by a unique identifier of the previously communicated second voice packet;
  retrieve the identified stored replacement voice packet from the voice packet buffer, wherein the identified stored replacement voice packet has the same unique identifier as the unique identifier of the previously communicated second voice packet; and
  communicate the retrieved replacement voice packet to the other PTT device, wherein the replacement voice packet includes the identifier that is the same as the at least one delayed, corrupted or lost second voice packet,
  wherein the other PTT device is configured to repair the second voice communication using the communicated replacement voice packet.

18. The PTT device of claim 17,
wherein the speaker is configured to generate sound corresponding to a comfort tone that is heard by the user of the PTT device,
wherein the comfort tone is initially generated in response to the jitter buffer manager identifying the occurrence of the at least one delayed, corrupted or lost first voice packet in the received first voice communication, and
wherein generation of the comfort tone is halted after the jitter buffer manager has stored the replacement voice packet into the jitter buffer such that the first voice communication is repaired with the voice communication portion of the replacement voice packet.

19. The PTT device of claim 17,
wherein the speaker is configured to generate sound corresponding to a comfort tone that is heard by the user of the PTT device,
wherein the comfort tone is initially generated by the speaker as an initial plurality of first voice packets are being received by the first packetizer,
wherein the initial plurality of received first voice packets correspond to an initial portion of the first voice communication, and
wherein generation of the comfort tone is halted and is replaced by an audible reproduction of the initial portion of the first voice communication.

* * * * *